United States Patent
Guillotte et al.

(10) Patent No.: US 9,377,066 B2
(45) Date of Patent: Jun. 28, 2016

(54) TRANSMISSION HYDRAULIC RETARDER CONTROL SYSTEM AND METHOD OF OPERATING

(71) Applicant: Caterpillar Inc., Peoria, IL (US)

(72) Inventors: Andrew R. Guillotte, East Peoria, IL (US); Travis Miller, Washington, IL (US); Don Wilbur, Manito, IL (US); Mark Batdorff, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 183 days.

(21) Appl. No.: 14/331,992

(22) Filed: Jul. 15, 2014

(65) Prior Publication Data

US 2016/0017948 A1    Jan. 21, 2016

(51) Int. Cl.
    *F16D 57/04*    (2006.01)
    *B60T 10/02*    (2006.01)

(52) U.S. Cl.
    CPC ............... *F16D 57/04* (2013.01); *B60T 10/02* (2013.01)

(58) Field of Classification Search
    USPC .................................................. 192/3.34, 216
    See application file for complete search history.

(56) References Cited

U.S. PATENT DOCUMENTS

| | | | | |
|---|---|---|---|---|
| 2,946,416 A | * | 7/1960 | Snoy | F16D 33/16 180/53.1 |
| 3,659,687 A | * | 5/1972 | Edmunds | F16H 41/30 192/216 |
| 3,814,221 A | * | 6/1974 | Fuehrer | F16D 65/78 192/221 |
| 3,863,739 A | * | 2/1975 | Schaefer | B60T 1/087 188/181 C |
| 4,881,625 A | | 11/1989 | Redelman | |
| 5,090,523 A | | 2/1992 | Vogelsang | |
| 5,101,941 A | | 4/1992 | Long et al. | |
| 5,456,340 A | | 10/1995 | Dadel et al. | |
| 5,507,360 A | | 4/1996 | Simmons | |
| 6,817,455 B1 | | 11/2004 | Gazyakan et al. | |
| 7,527,338 B2 | | 5/2009 | Long et al. | |
| 2016/0016570 A1 | * | 1/2016 | Guillotte | B60T 10/02 192/3.34 |

FOREIGN PATENT DOCUMENTS

| | | | | |
|---|---|---|---|---|
| EP | 1224408 A1 | 7/2002 | | |
| EP | 1308359 A2 | 5/2003 | | |
| GB | 1264238 A | * 2/1972 | | F16D 57/04 |

* cited by examiner

*Primary Examiner* — Richard Lorence
(74) *Attorney, Agent, or Firm* — Leydig, Voit & Mayer, Ltd.

(57) ABSTRACT

A method of operating a hydraulic retarder including directing fluid from a retarder pump to the retarder when the retarder is turned on. Fluid from a main pump is directed to a torque converter, which fluid is directed to at least one of a lube operation, a tank or a cooler when the retarder is turned off. Fluid from the main pump by way of the torque converter is directed to the retarder when the retarder is on, but not filled, and to the tank or the lube operation when the retarder is filled.

20 Claims, 4 Drawing Sheets

TRANSMISSION HYDRAULIC RETARDER CONTROL SYSTEM AND METHOD OF OPERATING

TECHNICAL FIELD

This patent disclosure relates generally to transmission hydraulic retarders, and, more particularly to a control system for a transmission hydraulic retarder.

BACKGROUND

Automatic transmissions in relatively large mobile machines often include a hydrodynamic retarder or hydraulic retarder that is associated with the output of, or input to, the transmission. When employed, hydraulic retarders utilize relative rotation of components within the retarder to assist in slowing the machine. The hydrodynamic retarder converts energy from the driveline into heat, which is then typically dissipated using the transmission oil cooling system.

Heat generated within the hydraulic retarder is dependent upon pressure developed with the hydraulic retarder. Flow into and out of the hydraulic retarder is sometimes controlled by respective valves. U.S. Pat. No. 7,527,338 B2 to Long, et al., discloses a hydromatic retarder control apparatus. The apparatus uses a retarder multi-function valve and a retarder regulator valve to provide flow to a flow valve and on to the retarder, lube cooler from a fluid pump, and return flow from the retarder.

SUMMARY

The disclosure describes, in one aspect, a method of operating a hydraulic retarder in a mobile machine including a transmission having a torque converter. The method includes providing fluid from a retarder pump to at least one retarder flow valve, directing flow through the retarder flow valve from the retarder pump back to the retarder pump or to at least one tank when the at least one retarder flow valve is in a retarder off position, providing fluid from a main pump to a torque converter, providing fluid from the torque converter to a cooler when the at least one retarder flow valve is in the retarder off position, moving the retarder flow valve to a retarder on position, directing flow through the retarder flow valve from the retarder pump to the hydraulic retarder when the retarder flow valve is in the retarder on position, directing flow from the torque converter to at least one retarder modulation valve when the at least one retarder flow valve is in the retarder on position, directing flow through the at least one retarder modulation valve to the hydraulic retarder when the at least one retarder flow valve is in the retarder on position if the hydraulic retarder has not reached a preset fluid pressure level, and directing flow through the at least one retarder modulation valve to a secondary operation when the at least one retarder flow valve is in the retarder on position.

The disclosure describes, in another aspect, a transmission hydraulic retarder control system for controlling fluid to a hydraulic retarder associated with a transmission. The hydraulic retarder is adapted to be on to provide retarding functions, or off such that it does not provide retarding functions. The transmission includes a torque converter. The control system includes at least one tank, a torque converter, a secondary operation, a main pump fluidly coupled to provide fluid flow to the torque converter, a cooler, a retarder pump, at least one retarder flow valve and at least one retarder modulation valve. The at least one retarder flow valve is fluidly coupled to selectively direct fluid from the retarder pump to the hydraulic retarder when the retarder flow valve is in a retarder on position, and to direct fluid from the retarder pump to at least one of back to the retarder pump and to the at least one tank when the retarder flow valve is in a retarder off position. The at least one retarder modulation valve is fluidly coupled to selectively direct fluid from the torque converter to the secondary operation when the hydraulic retarder is off, direct fluid from the torque converter to the hydraulic retarder when the hydraulic retarder is on but not filled, and to direct fluid from the torque converter to at least one of the at least one tank or the secondary operation when the hydraulic retarder is on and filled.

BRIEF DESCRIPTION OF THE DRAWING(S)

FIG. 2 is the schematic representation of FIG. 1 with the retarder on;

DETAILED DESCRIPTION

Figure 1:
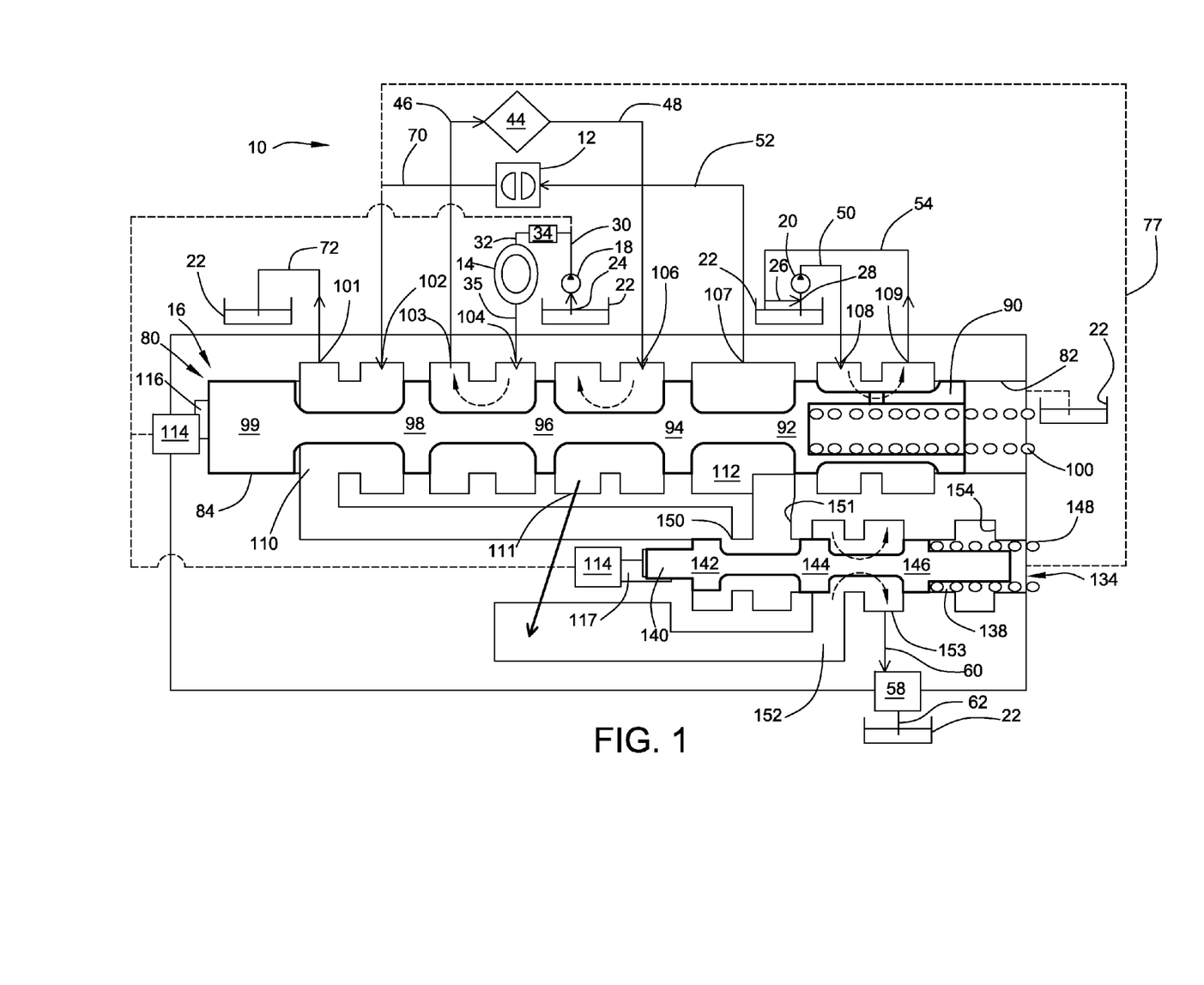
FIG. 1 is a schematic representation partly in block diagram form showing a hydraulic retarder control system according to aspects of this disclosure, the retarder being off.

Referring to FIG. 1, the hydraulic retarder control system 10 provides control of hydraulic fluid flow to a hydraulic retarder 12 as well as a torque converter 14 in connection with a transmission (not further illustrated). The hydraulic retarder control system 10 further includes a retarder-flow valve 16 and a retarder modulation valve 134. While the retarder-flow valve 16 and the retarder modulation valve 134 are illustrated as being disposed in a single valve body 80, the retarder-flow valve 16 and the retarder modulation valve 134 may be disposed in separate valve bodies, coupled by a plurality of fluid connections. Moreover, it will be appreciated that each of the retarder-flow valve 16 and the retarder modulation valve 134 may alternately include a plurality of valves (not illustrated) directed to the various flows through the hydraulic retarder control system 10.

The illustrated retarder-flow valve 16 includes the valve body 80 having a valve bore 82 in which a valve spool 84 is slidably disposed. The valve spool 84 has a plurality of equal diameter lands 90, 92, 94, 96, 98, 99 disposed along its length. The valve body 80 further includes a plurality of inlet and exhaust ports 101 104, 106 112 that are fluidly connected to the various conduits described throughout this disclosure. Movement of the valve spool 84 causes the lands, 90, 92, 94, 96, 98, 99 to block or connect the ports to direct flow through the retarder-flow valve 16.

Figure 2:
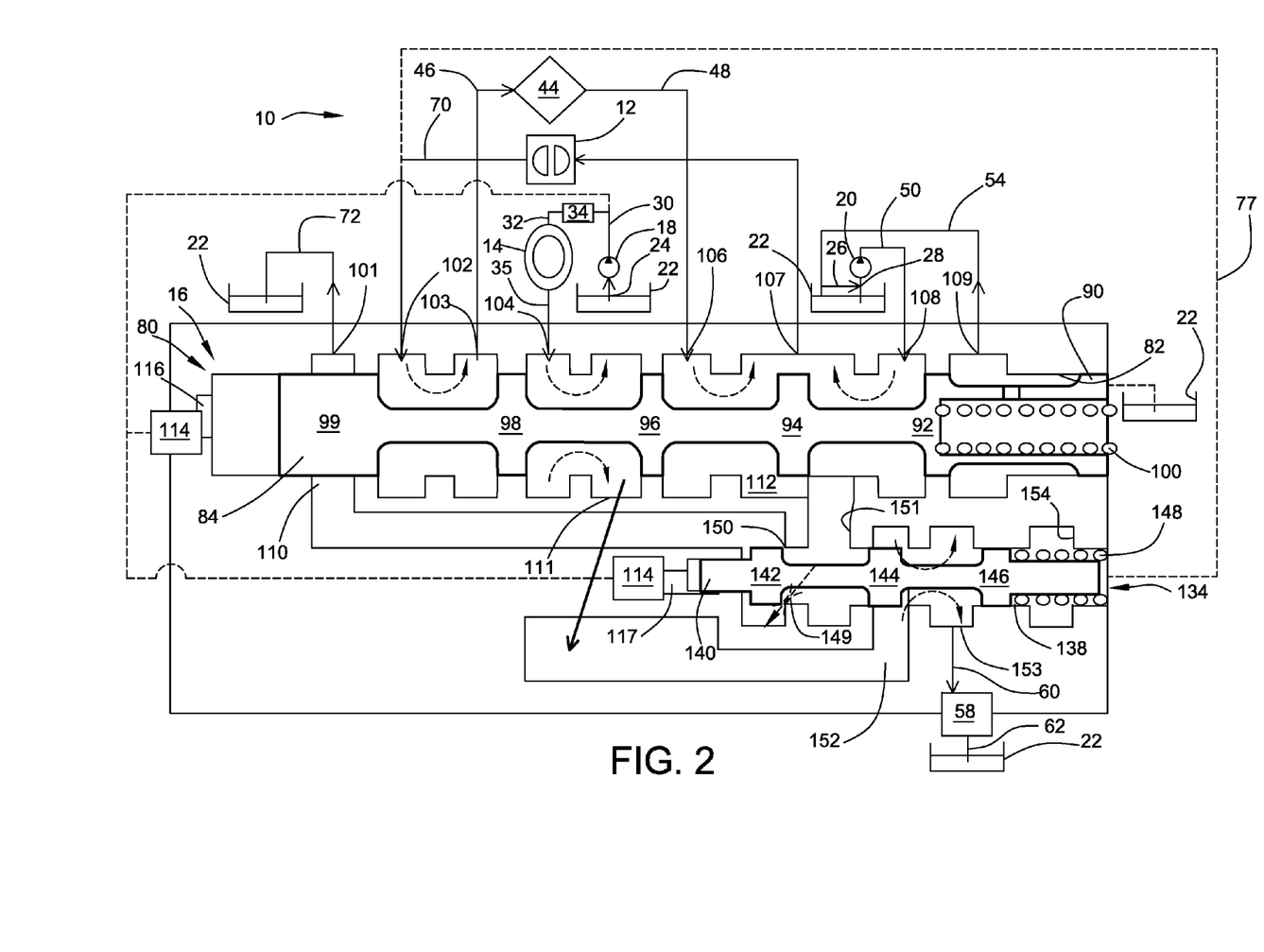
Figure 3:
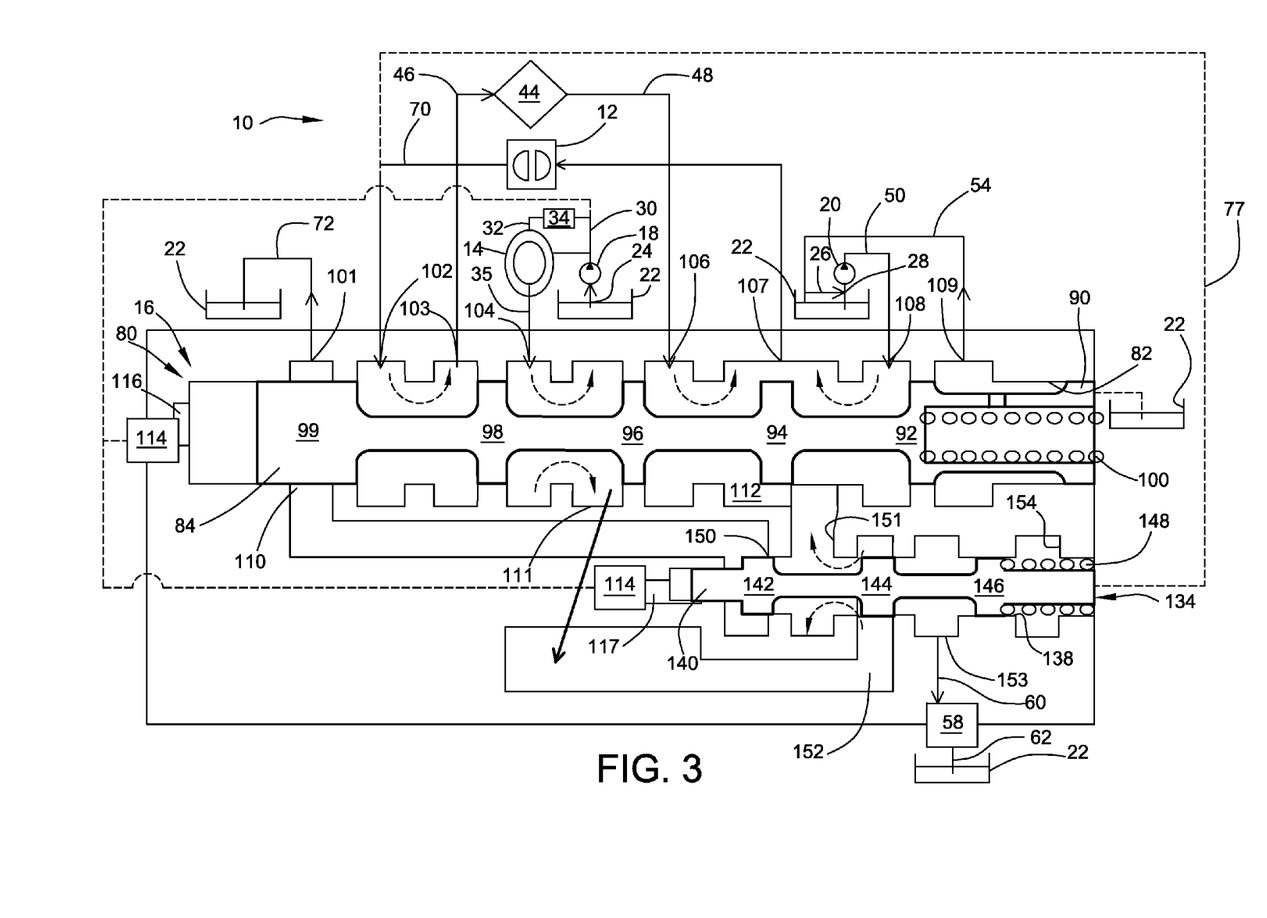
FIG. 3 is the schematic representation of FIG. 1 in a rapid fill configuration.

The valve spool 84 is urged to the left as illustrated in FIGS. 1-3 by a spring 100 disposed at the end of the valve spool 84 including land 90. The end of the valve spool 84 including land 90 is otherwise open to a tank 22. While the reference number 22 is utilized throughout as a designation for the tank, it will be appreciated that one or more tanks may be provided.

The retarder modulation valve 134 includes a valve bore 138 within the valve body 80, a valve spool 140 being slidably disposed within the valve bore 138. The valve spool 140 includes a plurality of lands 142, 144, 146. The valve body 80 additionally includes a plurality of ports 150, 151, 152, 153, 154, which may be selectively connected to various conduits depending upon the position of the valve spool 140 within the valve bore 138. The valve spool 140 is biased to the left in the illustrations by a spring 148, and return pressure flow from a retarder-out conduit 70 by way of a pressure take off 77, as will be explained in further detail below.

Returning to the retarder-flow valve 16, when the valve spool 84 is disposed in the "retarder off" position, that is, when the hydraulic retarder 12 is not operational, as illustrated in FIG. 1, fluid from the hydraulic retarder 12 may drain to the tank 22. More specifically, fluid from the retarder-out conduit 70 may enter the retarder-flow valve 16 at port 102. With lands 98, 99 of the valve spool 84 positioned as illustrated in FIG. 1, fluid entering port 102 is directed to port 101, and through drain conduit 72 to the tank 22. Similarly, fluid from a retarder-in conduit 52 is open to port 107 of the retarder-flow valve 16. With lands 92, 94 of the valve spool 84 and the lands 142, 144 of the retarder modulation valve 134 positioned as illustrated in FIG. 1, port 107 is likewise fluidly connected to the tank 22 by way of port 112 of the retarder-flow valve 16, ports 151, 150 of the retarder modulation valve 134, ports 110, 101 of the retarder-flow valve 16, and drain conduit 72.

According to a feature of the hydraulic retarder control system 10, a plurality of pumps 18, 20 is provided. While a main pump 18 and a retarder pump 20 are illustrated as separate pumps, the main pump 18 and retarder pump 20 could alternately be housed in a single housing (not illustrated), providing economies in packaging and assembly. Both the main pump 18 and the retarder pump 20 may draw fluid from and/or return fluid to tank 22 by way of one or more supply conduits 24, 26, 28.

The retarder pump 20 may selectively supply fluid from tank 22 to port 108 of the retarder-flow valve 16 by way of retarder-pump-out conduit 50. Depending upon the position of the valve spool 84 of the retarder-flow valve 16, fluid from retarder-pump-out conduit 50 may be selectively directed toward the hydraulic retarder 12 by way of the retarder-in conduit 52, or returned to the tank 22 by way of retarder-pump-return conduit 54.

More specifically, when the hydraulic retarder 12 is off, the valve spool 84 is in the "retarder off" position illustrated in FIG. 1. In this "retarder off" position, lands 90, 92 are positioned with the land 92 blocking flow access to port 107 such that fluid from the retarder pump 20 provided through the retarder-pump-out conduit 50 and port 108 is directed through port 109 to retarder-pump-return conduit 54. The retarder-pump-return conduit 54 may supply fluid directly to the retarder pump 20 by way of supply conduits 26, 28 to the tank 22.

Conversely, if when the hydraulic retarder 12 is on, the valve spool 84 is in the "retarder on" position illustrated in FIGS. 2 and 3. In this "retarder on" position, lands 90, 92, 94 are positioned with land 92 blocking flow access to port 109 such that fluid from the retarder pump 20 provided through the retarder-pump-out conduit 50 and port 108 is directed through port 107 to the retarder-in conduit 52 and on to the hydraulic retarder 12. Fluid flowing from the hydraulic retarder 12 through retarder-out conduit 70 enters the retarder-flow valve 16 at port 102. With the lands 98, 99 of the valve spool 84 positioned as illustrated in FIGS. 2 and 3, land 99 blocks flow to port 101 such that fluid is no longer directed to the tank 22 by way of port 101 and drain conduit 72. Rather, fluid entering the retarder flow valve through port 102 is directed to port 103 and on to a cooler 44 through cooler in conduit 46. Cooled fluid is returned through cooler-out conduit 48 and port 106 to the retarder flow valve 16. With lands 92, 94, 96 of the valve spool 84 positioned as illustrated in FIGS. 2 and 3, the cooled fluid joins the flow from the retarder pump 20 such that it may be returned to the hydraulic retarder 12.

According to another feature, flow to the hydraulic retarder 12 from the retarder pump 20 and the cooler 44 may be selectively regulated to modulate the level of retarding provided by the hydraulic retarder 12. In order to regulate the flow to the hydraulic retarder 12, the position of the valve spool 140 of the retarder modulation valve 134 may be adjusted to provide a selective bleeding to tank 22 of fluid otherwise flowing to the hydraulic retarder 12. More specifically, depending upon the respective positions of land 142 of valve spool 140 within the retarder modulation valve 134, an orifice 149 (see FIG. 2) may be opened at port 150 of the retarder modulation valve 134 to provide selective flow to port 110 of the retarder-flow valve 16. Flow through port 110 may proceed through port 101 to drain conduit 72 and on to the tank 22.

According to yet another feature, flow from the main pump 18 may be utilized not only for a primary function when the hydraulic retarder 12 is not operational or when the hydraulic retarder 12 is operating normally, but the main pump 18 may also be utilized to supplement flow to the hydraulic retarder 12 during initial retarder filling operations to provide a quick fill to the hydraulic retarder 12. In the illustrated embodiment, the main pump 18 supplies fluid from the tank 22 to the torque converter 14 by way of a conduit 24, main-pump-out conduit 30, and torque-converter-in conduit 32. Those of skill in the art will appreciate that the transmission includes a plurality transmission control valves 34 between the main pump 18 and the torque converter 14.

In this embodiment, when the hydraulic retarder 12 is operating normally (see FIG. 2) or not operational (see FIG. 1), fluid from the main pump 18 by way of a torque converter 14 is provided to a secondary operation, here, lube 58, either directly, or by way of the cooler 44. During initial filling operations, however, fluid from the main pump 18 by way of the torque converter 14 supplements the flow from the retarder pump 20 to more rapidly fill the hydraulic retarder 12.

More specifically, when the hydraulic retarder 12 is not operational, i.e., the retarder-flow valve 16 and the retarder modulation valve 134 are in the "retarder off" positions illustrated in FIG. 1, the main pump 18 pumps fluid from the tank 22 through conduit 24 to the torque-converter-in conduit 32. Fluid flowing from the torque converter 14 then flows from the torque-converter-out conduit 35 to port 104 of the retarder-flow valve 16. With lands 96, 98 positioned as illustrated in FIG. 1, fluid from port 104 flows through port 103 to the cooler in conduit 46 and the cooler 44. Cooled fluid flows from the cooler 44 through the cooler-out conduit 48 back to port 106 of the retarder flow valve 16. With lands 94, 96 positioned as illustrated in FIG. 1, fluid from port 106 is directed out of the retarder flow valve 16 through port 111 and on to port 152 of the retarder modulation valve 134 (see arrow). With the land 144 of the valve spool 140 of the retarder modulation valve 134 disposed to block flow to port 151, fluid flowing in through port 152 is directed to port 153 and on to lube 58 through lube-in-conduit 60. Fluid from lube 58 may flow further to the tank 22 through lube-out-conduit 62.

Turning to FIG. 2, when the hydraulic retarder 12 is operating normally, i.e., the retarder-flow valve 16 and the retarder modulation valve 134 are in the "retarder on" positions illustrated in FIG. 2, the main pump 18 pumps fluid from the tank 22 through conduit 24 to the torque-converter-in conduit 32. Fluid flowing from the torque converter 14 then flows from the torque-converter-out conduit 35 to port 104 of the retarder-flow valve 16. With lands 96, 98 positioned as illustrated in FIG. 2, however, fluid from port 104 flows through port 111 to port 152 of the retarder modulation valve 134. That is, the flow from the main pump 18 and torque converter 14 is no longer directed to the cooler 44 for cooling, but, rather, to the retarder modulation valve 134. With the land 144 of the valve spool 140 of the retarder modulation valve 134 disposed to block flow to port 151, fluid flowing in through ports 152, 154 is directed to port 153 and on to lube 58 through lube-in-conduit 60. Fluid from lube 58 may flow through lube-out-conduit 62 and on to the tank 22.

Turning now to FIG. 3, during initial filling operations, the retarder-flow valve 16 is disposed in the "retarder on" position illustrated in both FIGS. 2 and 3, but the retarder modulation valve 134 is in the "fast fill" position illustrated in FIG. 3. With the retarder-flow valve 16 in the "retarder on" position, land 98 of the valve spool 84 blocks flow to port 103 and the cooler 44. Rather, flow entering the retarder-flow valve 16 from the main pump 18 and torque converter 14 through port 104 is directed to port 111 and on to port 152 of the retarder modulation valve 134, as explained above. In this "fast fill" position, however, the valve spool 140 of the retarder modulation valve 134 is shifted to the right as illustrated in FIG. 3. In the "fast fill" position, land 144 of the valve spool 140 blocks flow to port 153 and lube 58. With lands 142, 144 in the position illustrated in FIG. 3, fluid from port 152 is directed to port 151. Fluid from port 151 of the retarder modulation valve 134 is fluidly coupled to port 112 of the retarder-flow valve 16, where it is mixed with fluid from the retarder pump 20 as well as fluid from the cooler 44. The mixed fluid flows through port 107 of the retarder-flow valve 16 to the retarder-in conduit 52, and on to the hydraulic retarder 12. As explained above with regard to the position of the valve spool 84 of the retarder-flow valve 16 disposed in the "retarder on" position, flow from the retarder-out conduit 70 enters the retarder-flow valve 16 at port 102. With the lands 98, 99 of the valve spool 84 positioned as illustrated in FIGS. 2 and 3, fluid is directed to port 103 and on to a cooler 44 through cooler in conduit 46. Cooled fluid is returned through cooler-out conduit 48 and port 106 of the retarder flow valve 16 to be mixed with fluid from the retarder pump 20 and the main pump 18, from which it is provided to the hydraulic retarder 12 through port 107.

Once the hydraulic retarder 12 reaches a desired pressure level, the retarder modulation valve 134 moves to the position illustrated in FIG. 2, discontinuing flow to the hydraulic retarder 12 from the main pump 18 by way of the torque converter 14. More specifically, land 144 of the valve spool 140 is moved to a position that blocks flow to port 151 from port 152, cutting off flow from the torque converter 14 to the hydraulic retarder 12. Rather, the land 144 is positioned to reopen flow from port 152 to port 153, which again opens flow from the torque converter 14/main pump 18 to lube 58. Referring again to FIG. 2, it is noted that the position of land 142 provides the orifice 149 between ports 151 and 150, port 150 being connected to the tank 22. In this way, fluid otherwise flowing to the hydraulic retarder 12 from one or both of the cooler 44 or the retarder pump 20 may be selectively bled to the tank 22 to modulate the operation of the hydraulic retarder 12, as explained above.

The retarder-flow valve 16 and the retarder modulation valve 134 may be operated by any appropriate arrangement. The illustrated valve spool 84 of the retarder-flow valve 16, for example, is biased toward the "retarder off" position illustrated in FIG. 1 by biasing element or spring 100 disposed at one end.

In order to move the valve spool 84 of the retarder-flow valve 16 to a "retarder on" position, as illustrated in FIGS. 2 and 3, a selectively actuable solenoid valve 114 is provided. The solenoid valve 114 may be electrically controlled by a transmission control module (not illustrated, but understood by those of skill in the art). Hydraulic fluid may be provided to the solenoid valve 114 by any appropriate source. For example, hydraulic fluid may be provided from the main-pump-out conduit 30 or by way of one or more of the transmission control valves 34.

Hydraulic pressure may be applied by the solenoid valve 114 through actuation conduit 116. In operation, hydraulic pressure applied is proportional to electric current applied at the solenoid valve 114. Upon application of braking requiring hydraulic retarding, pressure is selectively applied through the solenoid valve 114 and actuation conduit 116 to the land 99 of the valve spool 84, resulting in a rightward shift in the valve spool 84 against the force of spring 100. Pressure selectively applied through the solenoid valve may be provided from any appropriate source. For example, fluid pressure from the main pump 18 or another source may be directed through the solenoid valve 114. Operation of the solenoid valve 114 may be based upon instruction received from an operator or electronic control (not illustrated). In this way, the retarder-flow valve 16 may be actuated to move the valve spool 84 to the "retarder on" position illustrated in FIGS. 2 and 3.

The illustrated valve spool 140 of the retarder modulation valve 134 likewise is biased to the "retarder off" position illustrated in FIG. 1 by biasing element or spring 148. With the retarder modulation valve 134, however, the valve spool 140 is also biased to the "retarder off" position by pressure take off 77, which conveys pressure from the retarder-out conduit 70 to the valve spool 140. In this "retarder off" position, the retarder modulation valve 134 directs fluid from the main pump 18 to lube 58.

The valve spool 140 of the retarder modulation valve 134 may also be moved from the "retarder off" position to either the "fast fill" position illustrated in FIG. 3 or the "retarder on" position of FIG. 2 by a selectively actuable solenoid valve or the like. In this embodiment, the same solenoid valve 114 is utilized, although an alternate solenoid valve, similarly operated may be provided. Upon application of braking requiring hydraulic retarding, pressure is selectively applied through the solenoid valve 114 and actuation conduit 117 to the end of the valve spool 140, resulting in a rightward shift in the valve spool 140 against the force of spring 148. As with the retarder-flow valve 16, pressure selectively applied through the solenoid valve 114 may be provided from any appropriate source, and operation of the solenoid valve 114 may be based upon instruction received from an operator or electronic control (not illustrated). In this way, the retarder-flow valve 16 may be actuated to move the valve spool 84 from the "retarder off" position illustrated in FIG. 1.

In contrast to the retarder-flow valve 16 operation, however, the pressure applied through the solenoid valve 114 must work against both the pressure of the spring 148 and the pressure applied through pressure take off 77 from the retarder-out conduit 70. As a result, when the pressure in the retarder-out conduit 70 is low, as when the hydraulic retarder 12 is not yet filled, the pressure applied through pressure take off 77 will similarly be low. Conversely, when the pressure in the retarder-out conduit 70 is high, as when the hydraulic retarder 12 is filled and operating normally, the pressure applied through pressure take off 77 will be higher than when the hydraulic retarder 12 is not yet filled. Accordingly, when the hydraulic retarder 12 is not yet filled, less pressure will be required through solenoid valve 114 to move the valve spool 140 from the "retarder off" position than when the hydraulic retarder 12 is filled. In this way, when the hydraulic retarder 12 is not yet filled, application of pressure through the solenoid valve 114 will move the valve spool 140 to the "fast fill" position illustrated in FIG. 3. In this way, flow from the main pump 18 is redirected from lube 58 to the hydraulic retarder 12, assisting in quickly filling the hydraulic retarder 12.

As the pressure in the retarder-out conduit 70 increases, however, the pressure within the pressure take off 77 causes a shift in the retarder modulation valve 134 toward the "retarder on" position illustrated in FIG. 2. As a result, flow from the main pump 18 is again directed toward lube 58.

A command for operation of the hydraulic retarder 12 may be provided to the solenoid valve 114 and controls. Operation of the solenoid valve 114 and controls may be directed by one or more control modules (not shown), which provide a command indicative of a desired operating condition of the hydraulic retarder 12. The one or more control modules may be of any conventional design having hardware and software configured to perform the logic and send and receive appropriate signals to perform the disclosed logic. An electronic control module may include one or more controller units (not shown), and may be configured solely to perform the disclosed strategy, or to perform the disclosed strategy and other processes of the machine. The control module be of any suitable construction, and may include a processor (not shown) and a memory component (not shown). The processor may be microprocessors or other processors as known in the art. In some embodiments, the processor may be made up of multiple processors. Typically, the processor will have associated therewith long term (non volatile) memory for storing the program instructions, as well as short term (volatile) memory for storing operands and results during (or resulting from) processing.

Instructions associated with the disclosed strategy may be read into or incorporated into a computer readable medium, such as the memory component or provided external to processor. In alternative embodiments, hard wired circuitry may be used in place of or in combination with software instructions to implement the method. Thus, embodiments are not limited to any specific combination of hardware circuitry and software.

The term "computer readable medium" as used herein refers to any medium or combination of media that participates in providing instructions to processor for execution. Such a medium may take many forms, including but not limited to, non volatile media, volatile media, and transmission media. Non volatile media includes, for example, optical or magnetic disks. Volatile media includes dynamic memory. Transmission media includes coaxial cables, copper wire and fiber optics.

Common forms of computer readable media include, for example, a floppy disk, a flexible disk, hard disk, magnetic tape, or any other magnetic medium, a CD ROM, any other optical medium, punchcards, papertape, any other physical medium with patterns of holes, a RAM, a PROM, and EPROM, a FLASH EPROM, any other memory chip or cartridge, or any other medium from which a computer or processor can read. The memory component may include any form of computer readable media as described above. The memory component may include multiple memory components.

INDUSTRIAL APPLICABILITY

This disclosure relates to a transmission hydraulic retarder control system 10 for a mobile machine (not shown). The system 10 has universal applicability in various types of machines. The term "machine" may refer to any machine that performs some type of operation associated with an industry such as mining, construction, farming, transportation, or any other industry known in the art. For example, the machine may be an earth moving machine, such as a wheel loader, excavator, dump truck, backhoe, motor grader, material handler or the like. Moreover, one or more implements may be connected to the machine. Such implements may be utilized for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, blades, rippers, scarifiers, shears, snow plows, snow wings, and others.

The disclosed transmission hydraulic retarder control system 10 provides dual pumps 18, 20 that may provide separate flow circuits for transmission hydraulics and constant flow to the hydraulic retarder 12. The retarder modulation valve 134 provides additional flow from the main pump 18 during filling of the hydraulic retarder 12, which may provide rapid filling and availability of hydraulic retarding to supplement braking functions. This additional flow may eliminate the need for an accumulator. When the hydraulic retarder 12 is filled and on, the retarder modulation valve 134 switches flow from the main pump 18 to the lube operation 58.

Figure 4:
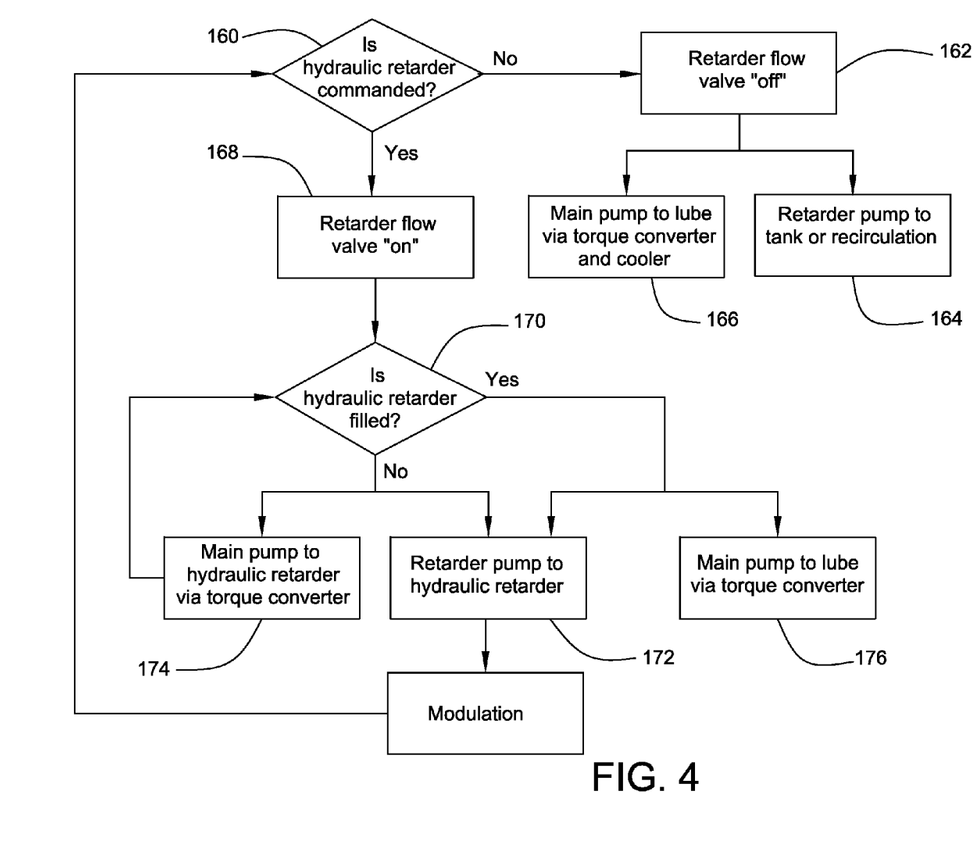
FIG. 4 is a logic diagram for operation of the control system of FIGS. 1 3.

A logic chart for off, on, and fill of the hydraulic retarder 12 is provided in FIG. 9. As indicated by block 160, if the hydraulic retarder 12 is not commanded, the retarder-flow valve 16 remains in the off position (block 162). As a result, flow from the retarder pump 20 is directed to recirculation or tank 22 (block 164), flow from the main pump 18 is directed to the lube operation 58 or via the torque converter 14 and the cooler 44 (block 166).

Conversely, when the hydraulic retarder 12 is indicated, flow from the solenoid valve 114 causes the valve spool 84 of the retarder-flow valve 16 to shift to the on position (block 168), and resulting flow in the system 10 is dependent upon whether the hydraulic retarder 12 is filled and ready for operation (block 170). While flow from the retarder pump 20 is directed to the hydraulic retarder 12 via retarder modulation valve 134 whether or not the hydraulic retarder 12 is filled (block 172), flow from the main pump 18 is dependent upon whether the hydraulic retarder 12 is filled. If the hydraulic retarder is not filled, flow from the main pump 18 is directed to the hydraulic retarder 12 via the torque converter 14 and the retarder-flow valve 16 and retarder modulation valve 134 (block 174).

Flow from the main pump 18 continues to fill the hydraulic retarder 12 until such time as the pressure within the retarder-out conduit 70 reaches a preset pressure, indicating that the hydraulic retarder 12 is filled. When the pressure in the retarder-out conduit 70 reaches the preset pressure, the retarder modulation valve 134 redirects the flow from the main pump 18 via the torque converter 14 to the lube operation 58 (block 176). The hydraulic retarder 12 if further modulated by the retarder modulation valve 134 (block 178).

The retarder modulation valve 134 being independent of the retarder-flow valve 16 may allow separate control of flow and retarding torque within the hydraulic retarder 12. In some embodiments, the retarder modulation valve 134 is relatively insensitive to flow.

In some modes of operation of some embodiments, fluid cooled by the cooler 44 flows to the tank 22, mixing with uncooled fluid from the lube operation 58. In some modes of operation of some embodiments, fluid cooled by the cooler 44 mixes with uncooled fluid from the main pump 18/torque converter 14 or from the retarder pump 20.

The disclosed transmission hydraulic retarder control system 10 may require only a single cooler.

In some embodiments, both the retarder-flow valve 16 and retarder modulation valve 134 are spool valves, which may reduce or minimize the number of valves of the system 10. In some embodiments, the retarder modulation valve 134 may control both retarder absorption levels and hydraulic retarder fill rate.

Some embodiments may provide improved manufacturability over current designs.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above described elements in all possible variations thereof is encompassed by the disclosure unless otherwise indicated herein or otherwise clearly contradicted by context.

We claim:

1. A method of operating a hydraulic retarder in a mobile machine including a transmission having a torque converter, the method comprising:
   providing fluid from a retarder pump to at least one retarder flow valve,
   directing flow through the retarder flow valve from the retarder pump back to the retarder pump or to at least one tank when the at least one retarder flow valve is in a retarder off position,
   providing fluid from a main pump to the torque converter,
   providing fluid from the torque converter to a cooler when the at least one retarder flow valve is in the retarder off position,
   moving the retarder flow valve to a retarder on position,
   directing flow through the retarder flow valve from the retarder pump to the hydraulic retarder when the retarder flow valve is in the retarder on position,
   directing flow from the torque converter to at least one retarder modulation valve when the at least one retarder flow valve is in the retarder on position,
   directing flow through the at least one retarder modulation valve to the hydraulic retarder when the at least one retarder flow valve is in the retarder on position if the hydraulic retarder has not reached a preset fluid pressure level, and
   directing flow through the at least one retarder modulation valve to a secondary operation when the at least one retarder flow valve is in the retarder on position if the hydraulic retarder has reached the preset fluid pressure level.

2. The method of claim 1 further including providing fluid from the torque converter through the at least one retarder flow valve to the cooler when the at least one retarder flow valve is in the retarder off position.

3. The method of claim 2 further including directing flow from the cooler through the at least one retarder flow valve to the at least one secondary operation when the at least one retarder flow valve is in the retarder off position.

4. The method of claim 1 further including:
   modulating fluid flow to the hydraulic retarder by selectively bleeding fluid from fluid flow into the hydraulic retarder to the at least one tank when the at least one retarder flow valve is in the retarder on position.

5. The method of claim 4 further including:
   modulating fluid flow to the hydraulic retarder by selectively bleeding fluid from the fluid flow into the hydraulic retarder to the at least one tank when the hydraulic retarder has reached the preset fluid pressure level.

6. The method of claim 5 wherein bleeding fluid to the at least one tank includes bleeding fluid from the fluid flow into the hydraulic retarder through the at least one retarder modulation valve to the at least one tank.

7. The method of claim 6 wherein bleeding fluid through the at least one retarder modulation valve to the at least one tank includes bleeding fluid from the at least one retarder modulation valve to the at least one retarder flow valve to the at least one tank.

8. The method of claim 1 further including fluidly coupling fluid pressure in a retarder out conduit to actuate the at least one retarder modulation valve.

9. The method of claim 1 further including utilizing a solenoid to actuate the retarder flow valve.

10. The method of claim 9 further including:
    providing a signal indicative of a commanded operating condition of the hydraulic retarder to the solenoid valve, and
    providing flow through the solenoid valve to the retarder flow valve to move the retarder flow valve to the on position in response to the commanded operating condition of the hydraulic retarder.

11. A transmission hydraulic retarder control system for controlling fluid to a hydraulic retarder associated with a transmission, the hydraulic retarder being adapted to be on to provide retarding functions, or off such that it does not provide retarding functions, the transmission including a torque converter, the control system comprising
    at least one tank,
    a secondary operation,
    a main pump fluidly coupled to provide fluid flow to the torque converter,
    a cooler,
    a retarder pump,
    at least one retarder flow valve fluidly coupled to selectively direct fluid from the retarder pump to the hydraulic retarder when the retarder flow valve is in a retarder on position, and to direct fluid from the retarder pump to at least one of back to the retarder pump and to the at least one tank when the retarder flow valve is in a retarder off position, and at least one retarder modulation valve fluidly coupled to selectively direct fluid from the torque converter to the secondary operation when the hydraulic retarder is off, direct fluid from the torque converter to the hydraulic retarder when the hydraulic retarder is on but not filled, and to direct fluid from the torque converter to at least one of the at least one tank and the secondary operation when the hydraulic retarder is on and filled.

12. The control system of claim 11 wherein the at least one retarder flow valve is coupled to direct fluid from the torque converter to the cooler and from the cooler to the at least one retarder modulation valve from which the at least one retarder modulation valve directs the fluid to the at least one secondary operation when the retarder flow valve is in the retarder off position.

13. The control system of claim 12 further including a retarder in conduit and a retarder out conduit, and wherein the at least one retarder flow valve is further fluidly coupled to the retarder out conduit and to the retarder in conduit, the at least one retarder flow valve being operable to direct flow from the retarder out conduit to the cooler, and from the cooler to the retarder in conduit when the at least one retarder flow valve is in the retarder on position, the at least one retarder modulation valve also being fluidly coupled to the retarder in conduit, the at least one retarder modulation valve being selectively actuable to bleed fluid from the retarder in conduit, the retarder out conduit being fluid coupled to apply fluid pressure to the at least one retarder modulation valve to selectively actuate the at least one retarder modulation valve to bleed fluid from the retarder in conduit.

14. The control system of claim 11 further including a retarder in conduit and a retarder out conduit, and wherein the at least one retarder flow valve is further fluidly coupled to the retarder out conduit and to the retarder in conduit, the at least one retarder flow valve being operable to direct flow from the retarder out conduit to the cooler, and from the cooler to the retarder in conduit when the at least one retarder flow valve is in the retarder on position.

15. The control system of claim 11 further including a retarder in conduit, and wherein the at least one retarder modulation valve is fluidly coupled to the retarder in conduit, and is selectively actuable to bleed fluid from the retarder in conduit.

16. The control system of claim 15 further including a retarder out conduit, the retarder out conduit being fluidly coupled to apply fluid pressure to the at least one retarder modulation valve to selectively actuate the at least one retarder modulation valve to bleed fluid from the retarder in conduit.

17. The control system of claim 11 wherein the at least one retarder flow valve is coupled to direct fluid from the hydraulic retarder to the cooler and from the cooler to the hydraulic retarder when the retarder flow valve is in the retarder on position.

18. The control system of claim 11 further including a solenoid valve selectively operable to direct fluid to move the retarder flow valve from the retarder off position to the retarder on position.

19. A transmission hydraulic retarder control system for controlling fluid to a hydraulic retarder associated with a transmission, the hydraulic retarder being adapted to be on to provide retarding functions, or off such that it does not provide retarding functions, the transmission including a torque converter, the control system comprising at least one tank,
at least one lube operation,
a cooler,
a retarder pump,
a main pump fluidly coupled to provide fluid to the torque converter,
a retarder modulation valve, and
a retarder flow valve,
the retarder flow valve being coupled and being adapted to provide selective fluid between two or more of the torque converter, the at least one tank, the hydraulic retarder, the cooler, the retarder pump, and the retarder modulation valve, the retarder flow valve being adapted
to selectively direct fluid from the retarder pump to the hydraulic retarder when the retarder flow valve is in a retarder on position, and to at least one of back to the retarder pump or to the at least one tank when the retarder flow valve is in a retarder off position, and
to selectively direct fluid from the torque converter to the cooler when the retarder flow valve is in the retarder off position, and to direct fluid from the torque converter to the retarder modulation valve when the retarder flow valve is in the retarder on position,
the retarder modulation valve being coupled and being adapted to provide selective fluid between two or more of the at least one tank, the hydraulic retarder, the at least one lube operation, and the retarder flow valve, the modulation valve being adapted
to selectively direct fluid from the retarder flow valve to the hydraulic retarder when the retarder flow valve is in the retarder on position and the hydraulic retarder is not filled,
to selectively direct fluid from the retarder flow valve to the at least one lube operation when the retarder flow valve is in the retarder off position, and
to selectively direct fluid from the retarder flow valve to the at least one lube operation when the retarder flow valve is in the retarder on position and the hydraulic retarder is filled.

20. The control system of claim 19 wherein the retarder modulation valve is coupled and adapted to bleed to the at least one tank, fluid from flow to the retarder to modulate operation of the retarder, and wherein the retarder flow valve is coupled and adapted to selectively direct fluid from the retarder to the cooler and from the cooler to the retarder when the retarder flow valve is in the retarder on position.

* * * * *